Dec. 9, 1924.                                                      1,518,621
F. WENK
SUPPORTING WING FOR FLYING MACHINES
Filed Jan. 17, 1922         2 Sheets-Sheet 1
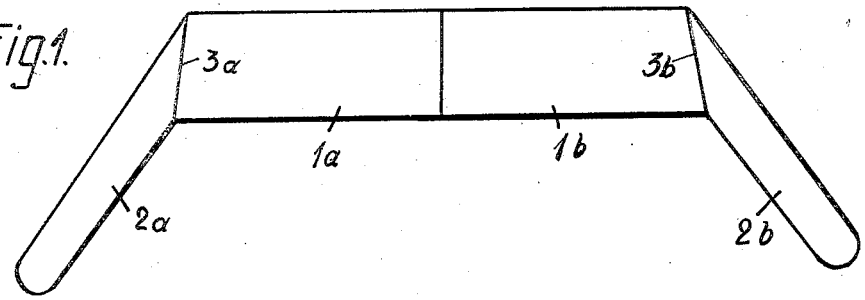
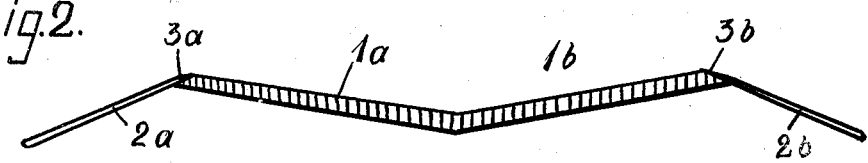
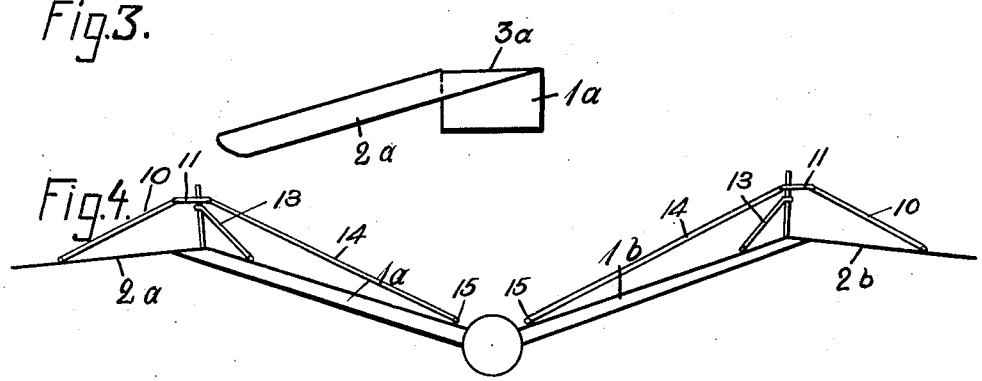
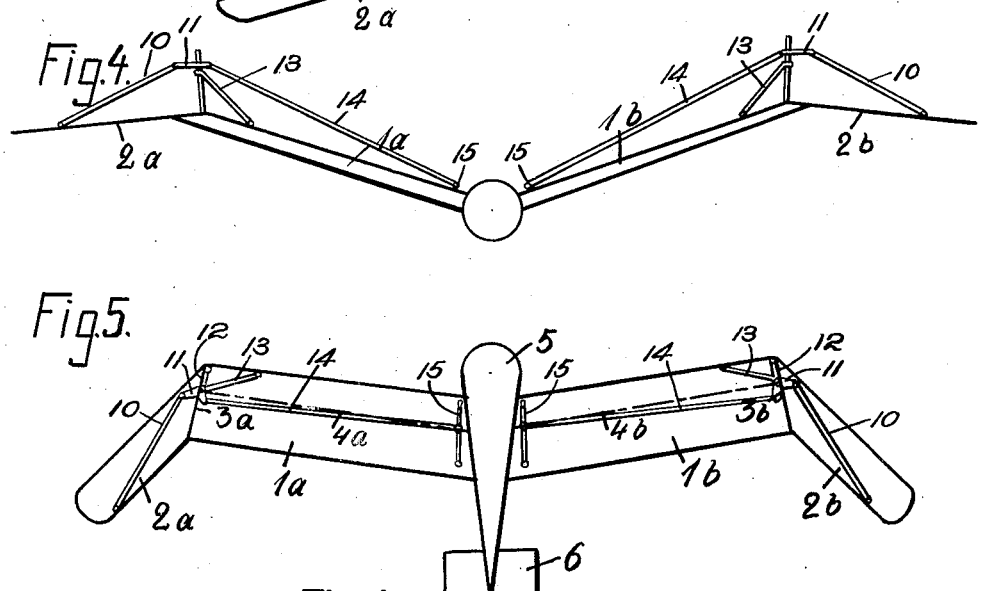
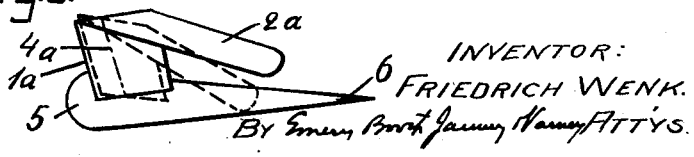
INVENTOR:
FRIEDRICH WENK.

Dec. 9, 1924.　　　　　　　　　　　　　　　　1,518,621
F. WENK
SUPPORTING WING FOR FLYING MACHINES
Filed Jan. 17, 1922　　　2 Sheets-Sheet 2

INVENTOR:
FRIEDRICH WENK.
By　　　　　　ATTYS.

Patented Dec. 9, 1924.

1,518,621

UNITED STATES PATENT OFFICE.

FRIEDRICH WENK, OF GOTTINGEN, GERMANY, ASSIGNOR TO EDWARD H. PALMER, TRUSTEE, OF BOSTON, MASSACHUSETTS.

SUPPORTING WING FOR FLYING MACHINES.

Application filed January 17, 1922. Serial No. 529,981.

*To all whom it may concern:*

Be it known that I, FRIEDRICH WENK, of Gottingen, Germany, have invented certain new and useful Improvements in Supporting Wings for Flying Machines, for which I have filed three applications in Germany, dated 10th April, 1919, 27th March, 1920, and 11th November, 1921, and of which the following is a specification.

This invention relates to flying machines of the airplane type, and consists more particularly in improvements in the stabilization and control of such machines.

The invention will be best understood by reference to the following description when taken in connection with the accompanying illustration of one specific embodiment thereof, while its scope will be more particularly pointed out in the appended claims.

In the drawings,—

Fig. 1 is a view in plan looking from the under side and showing an airplane embodying one form of the invention, the fuselage and parts other than the supporting wings being omitted for sake of simplicity;

Fig. 2 is a front elevation of the airplane shown in Fig. 1;

Fig. 3 is a side elevation of the same airplane;

Fig. 4 is a rear elevation showing a second form of airplane, the main wings of which are adapted to automatically turn under the influence of the adjustable outer auxiliary wings;

Fig. 5 is a plan view of the airplane shown in Fig. 4;

Fig. 6 is a side elevation of the same airplane, the dotted lines showing the position of the wings when the machine is at rest;

Figures 7, 8:
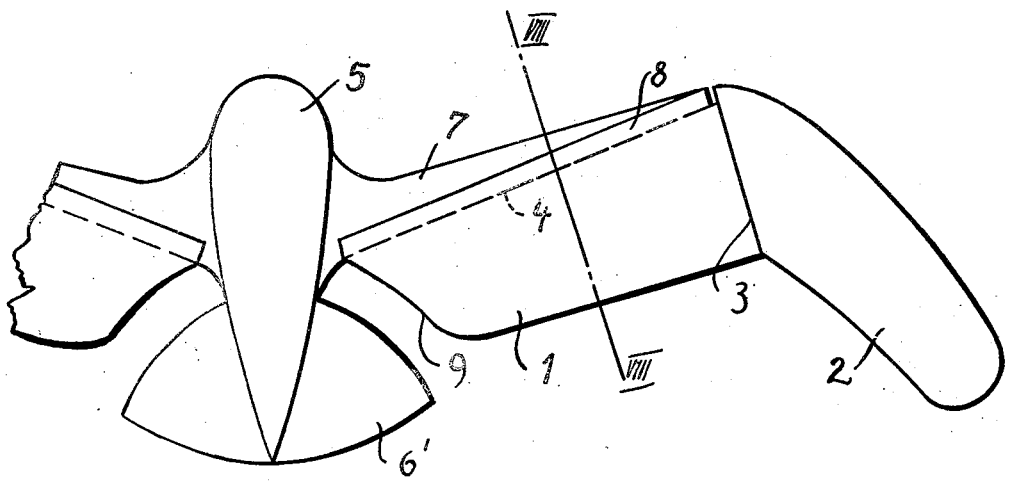
Fig. 7 is a plan view of a third form of airplane, a portion only of the main wings of which are adjustable.
Fig. 8 is a longitudinal transverse section taken on the line VIII—VIII in Fig. 7.

Referring to the form of the invention shown in Figs. 1 to 3 inclusive, an airplane is there shown, the main supporting wings of which comprise the parts $1^a$, $1^b$ which extend upwardly from the center to the sides to present a V shape or positive dihedral angle. In the direction of flight these wings are also given each a positive angle of incidence of useful amount. Such airplane also comprises the outer auxiliary wing parts $2^a$, $2^b$, which are constructed to serve as stabilizing and steering surfaces and are given each a negative angle of incidence. Preferably the main wings $1^a$, $1^b$ are provided with inclined lateral edges $3^a$, $3^b$, which in the illustrative embodiment of the invention are inclined forwardly and inwardly at an angle of about 10° with the longitudinal medium plane of the airplane, so that these edges extend in the direction of the edge whirls flowing off from the main supporting wing $1^a$, $1^b$.

The outer wing parts $2^a$, $2^b$ each extends outwardly and rearwardly with its major portion lying at the rear of the lateral edges of the adjacent main wing. Each outer wing part lies in a plane which intersects the main wing plane $1^a$, $1^b$ along the edges $3^a$, $3^b$ at such an inclination as to give the desired negative angle of incidence to the wing part $2^a$, or $2^b$. This provides an outer stabilizing plane which, in the direction of flight, is negatively inclined with relation to the main wing and is attached to the edges of the main wing by a portion bounded by oblique lateral edges, the attaching edge of the auxiliary wing being oblique to the outer edge thereof. This provides an auxiliary outer wing with a relatively small portion lying within the influence of the edge whirls from the main wing and having its major part at the rear of the outer edges of the main wing and outside of the influence of such edge whirls. Through this disposition of the auxiliary wings a high degree of stability and control may be had.

In the form of the invention shown in Figs. 4 to 6 inclusive, the parts of the airplane are essentially the same as those already described and are designated by the same reference characters. In this construction, however, the main wings $1^a$, $1^b$ are adapted to be turned about the axes $4^a$, $4^b$ which are indicated by dotted lines. The wings are thereby free to adjust themselves with reference to the body 5 under the influence of the air forces which act upon the auxiliary wing parts $2^a$, $2^b$. The body 5 is held in the direction of flight by a tail surface 6, the latter being somewhat loaded, and the axes $4^a$, $4^b$ being located at a point somewhat in front of the center of gravity of body 5, including the load. The main wings are also extended forwardly from the sides of the body 5 so as to insure a favorable relation between the center of gravity and center of lift.

Because of the adjustability of the angle of incidence of the main wings, the latter may be so adjusted by the action of the auxiliary wing parts $2^a$, $2^b$ that an automatic stabilization of the machine may at all times be obtained. Furthermore, the auxiliary wing parts $2^a$, $2^b$ may be fastened by links or made of elastic material so that, by elevating or lowering their outermost points, they may be bent and their angle of inclination thereby altered. Any of the usual controlling devices, such as wires or similar connections, may be provided for bending the auxiliary wing parts at the will of the operator. The auxiliary wing parts may be so constructed that they are normally bent downward, but may be drawn upward through the use of control wires, so that their negative angles of inclination may be increased.

In the drawings for purposes of illustration an ordinary warping gear is shown for adjusting the auxiliary wing parts, such gear comprising for each wing the rod or link 10 having one end connected to the rear edge of the auxiliary wing near its outer end, and the opposite end to one arm of a bell-crank lever 11 pivotally connected on the struts 12 and 13. The remaining arm of the bell-crank lever is connected through the link 14 to the pivoted hand-levers 15 arranged at a convenient point with reference to the pilot's position, so that the latter by moving the two hand-levers 15 can exercise control directly over the side wings and thereby indirectly over the main wings.

By this means not only the lateral and longitudinal stabilization but also the full control of the flying machine can be effected, the lateral control being provided by oppositely adjusting the auxiliary wings, and control in an upward or downward direction being effected by adjusting both auxiliary wings in the same direction.

The links 14 extend substantially along the direction of the axes $4^a$, $4^b$ so that the main wings $1^a$, $1^b$ are not directly influenced by the governing devices, the axes $4^a$, $4^b$ being sufficiently rigid to sustain the forces exerted by the links. The main wings are indirectly influenced, however, through the adjustment of the auxiliary wing parts to assist the side stabilizing and steering actions.

Instead of mounting the wings to turn about the axes $4^a$, $4^b$, they may be fastened rigidly to the body 5 and constructed elastically in such a way that, by the action of the auxiliary wing parts, they are bent or warped to alter their angle of incidence, such bending taking place mainly near the auxiliary wing parts. The stabilizing force in this case is greater than where the wings turn as a whole about the axes $4^a$, $4^b$, since the greatest alteration of the angle of incidence takes place at the greatest distance from the median plane of the machine where are air forces exert their greatest possible leverage with reference to the center of gravity. Whether the main wing is twisted or turned, however, the effective angle of incidence of the wing is adjusted by the operation of twisting or turning.

In the embodiment of the invention shown in Figs. 7 and 8 the same reference characters are used to designate the main and auxiliary wing parts and the same general principles are controlled. In this form, however, to the body 5 there are rigidly attached two forwardly and upwardly inclined girders 7 which comprise each a framework provided with a suitable covering and having a cross-sectional outline similar to the usual cross-sectional outline of the front edges of a flying machine wing. These girders are preferably of such strength that they are self-supporting, that is to say, they are capable of sustaining the load without the use of external wires or other reinforcements. Each girder 7 is provided with a pivot or articulation 4, by means of which the adjacent main wing part 1 is hinged to the girder frame, permitting the turning adjustment of the main wing with relation thereto. The hinge attachment 4 is herein shown as arranged at the rear lower edge of the girder frame 7 so that it lies at the point where the flowing air moves very slowly and therefore causes no unnecessary air resistance. At the same time the overlapping portion 8 of the upper main wing surface near its forward edge is disposed concentrically with reference to the pivot 4, being given a cylindrical or conical contour, which in all adjusted positions of the wing entirely covers the joint between the wing and the girder frame and provides a substantially smooth, uninterrupted profile for the upper curve of the aerofoil and without harmful effect on the movement of air over the same.

The overlapping portion 8 is preferably pressed into frictional contact with the surface of the wing part 7, either through its own resiliency or by the use of auxiliary springs, and may be utilized to check or reduce the vibratory movements of the main wing parts 1, or similar checking or damping effects may be had by the use of springs or other resilient devices acting in opposition to the movements of the wings.

The action of the main wing parts 1 and the auxiliary wings 2 in respect to stabilization and control is substantially the same as in the two preceding forms, the outline of each auxiliary wing 2, however, being altered in that it is somewhat more rounded along its leading edge and is thereby better adapted for meeting the air currents.

In the direction of flight the main wing 1 has its greatest breadth near its outer edge 3, this breadth diminishing gradually toward the body 5. Near the body at 9 the width of the main wing 1 decreases very rapidly. The effect, therefore of variations in the angle of incidence of the entire main wing, due to adjustment of the wing part 1 about the pivot 4, is greatest toward its outer end and near the auxiliary wing part 2, providing thereby a favorable stabilizing effect through the action of the auxiliary wings. The total breadth of the wing effective for lift, however, and comprising the surface of both the portions 7 and 1 is substantially the same for the entire length of the wing, for the rigid girder portion 7 is enlarged toward the body in substantially the same proportion as the width of the adjustable wing part 1 decreases.

At the rear of the body 5, where the wing becomes sharply narrowed at 9, there is provided a tail surface 6 having such a profile that it occupies approximately the space which would have been occupied by the prolongation of the wing 1 were the latter prolonged to the body without its sharply narrowed termination at the point 9. This tail adds to the lift of the machine approximately what is lost by the cutting away of the main wing part 1 near the body of the machine. The tail surface 6 is constructed as a load supporting surface, coacting with the wings, so that the lifting forces are appropriately distributed over the entire spread of the wings, the lift from the median plane of the machine toward the outer lateral edges of the wings following the elliptical curve of distribution.

The described stabilizing and steering devices have proved of great adaptability and effectiveness in connection with motorless gliders where merely the natural movements of the air are utilized, but they may also be used to advantage in connection with motor driven machines or by utilizing smaller motors than are now customary.

While I have herein shown and described for the purposes of illustration one or more specific embodiments of the invention, it is to be understood that the invention is not limited to the details of construction or form or to the relative arrangement of parts which herein are specifically shown and described for purposes of illustration, but that extensive deviations may be made therefrom without departing from the spirit of the invention.

Claims—

1. An airplane having main supporting wings arranged at a positive dihedral angle and auxiliary stabilizing wings attached to the outer ends of the main wings, each auxiliary wing for normal flight being inclined downwardly towards its tip with relation to the adjoining main wing and its junction with the main wing being inclined forwardly and inwardly with relation to the median longitudinal plane of the airplane, the auxiliary outer wing thereby presenting a negative angle of attack with relation to the angle of attack of the main wing and each auxiliary wing also extending rearwardly and outwardly to a substantial distance away from the end of the adjoining main wing to present a substantial portion at the rear thereof and outside the influence of the edge whirls therefrom whereby said auxiliary wings may act as stabilizing surfaces.

2. An airplane having main supporting wings arranged at a positive dihedral angle, each main wing being adjustable to permit alteration in its angle of attack, and outer auxiliary stabilizing wings attached to the outer ends of the main wings, each auxiliary wing for normal flight being inclined downwardly towards its tip with relation to the adjoining main wing and its junction with the main wing being inclined forwardly and inwardly with relation to the median longitudinal plane of the airplane, the auxiliary outer wing thereby presenting a negative angle of attack with relation to the angle of attack of the main wing and each auxiliary wing also extending rearwardly and outwardly to a substantial distance away from the end of the adjoining main wing to present a substantial portion at the rear thereof and outside the influence of the edge whirls therefrom whereby said auxiliary wings may act as stabilizing surfaces.

3. An airplane having main supporting wings arranged at a positive dihedral angle, each main wing being adjustable to permit alteration in its angle of attack and outer auxiliary stabilizing wings pivotally attached to the outer ends of the main wings, each auxiliary wing for normal flight being inclined downwardly towards its tips with relation to the adjoining main wing and its pivotal axis being inclined forwardly and inwardly with relation to the median longitudinal plane of the airplane, the auxiliary wing thereby presenting a negative angle of attack with relation to the angle of attack of the main wing and each auxiliary wing also extending rearwardly and outwardly to a substantial distance away from the end of the adjoining main wing to present a substantial portion at the rear thereof and outside of the influence of the edge whirls therefrom whereby said auxiliary wings may act as stabilizing surfaces.

4. An airplane having main supporting wings arranged at a positive dihedral angle, each main wing being adjustable to permit alteration in its angle of attack and outer auxiliary stabilizing wings pivotally attached to the outer ends of the main wings, each auxiliary wing for normal flight being inclined downwardly towards its tips with relation to the adjoining main wing and its pivotal axis being inclined forwardly and inwardly with relation to the median longitudinal plane of the airplane, the auxiliary wing thereby presenting a negative angle of attack with relation to the angle of attack of the main wing and each auxiliary wing also extending rearwardly and outwardly to a substantial distance away from the end of the adjoining main wing to present a substantial portion at the rear thereof and outside of the influence of the edge whirls therefrom whereby said auxiliary wings may act as stabilizing surfaces, and devices to control the angle of attack of each auxiliary wing with relation to the angle of the main wing.

5. An airplane having main supporting wings arranged at a dihedral angle and outer auxiliary wings attached by obliquely cut lateral edges to the lateral edges of the main wings, said auxiliary wings being extended outwardly and rearwardly with relation thereto, said main wings being each composed of a rigid forward portion and a rear portion pivoted to said forward portion on an axis transverse to the direction of flight, and said auxiliary wings being each secured to said rear wing portion.

6. An airplane having main supporting wings comprising each a rigid forward portion and a rear portion pivoted to said forward portion to adjustably turn about an axis transverse to the direction of flight, and an auxiliary outer wing secured to each rear portion and extending outwardly and rearwardly therefrom.

7. An airplane having main supporting wings arranged at a dihedral angle and auxiliary wings attached by obliquely cut lateral edges to the outer lateral edges of the main wings, said auxiliary wings being extended outwardly and rearwardly with relation thereto, said main wings being each composed of a rigid forward portion and a rear portion pivoted to said forward portion on an axis transverse to the direction of flight, the latter being located at the under side of the wing and in the region where relatively slow air movement takes place, and said auxiliary wings being each secured to said rear wing portion.

8. An airplane having main supporting wings comprising each a rigid forward portion and a rear portion pivoted to said forward portion to adjustably turn about an axis transverse to the direction of flight, the latter being located at the under side of said wing and in the region where relatively slow air movement takes place, and an auxiliary outer wing secured to each rear portion and extending outwardly and rearwardly therefrom.

9. An airplane having main supporting wings arranged at a dihedral angle and auxiliary wings attached by obliquely cut lateral edges to the outer lateral edges of the main wings, said auxiliary wings being extended outwardly and rearwardly with relation thereto, said main wings being each composed of a rigid forward portion and a rear portion pivoted to said forward portion on an axis transverse to the direction of flight, said rear portion decreasing in breadth from the outer lateral edges toward the median plane of the airplane and said auxiliary wings being each secured to said rear wing portion.

10. An airplane having main supporting wings comprising each a rigid forward portion and a rear portion pivoted to said forward portion to adjustably turn about an axis transverse the direction of flight, said rear portion being of decreasing breadth from its lateral edge toward the median plane of the airplane, and an auxiliary outer wing secured to each rear portion and extending outwardly and rearwardly therefrom.

11. An airplane having main supporting wings arranged at a dihedral angle and outer auxiliary wings attached by obliquely cut lateral edges to the outer edges of the main wings, said auxiliary wings being extended outwardly and rearwardly with relation thereto, said main wings being each composed of a rigid forward portion and a rear portion pivoted to said forward portion on an axis transverse to the direction of flight, said auxiliary wings being each secured to said rear wing portion, the surface of said rear wing portion being cut away toward the median plane of the apparatus, and a supporting tail surface arranged to assist in supplying the lift lost by the absence of the cut-away part of the rear wing portion.

12. An airplane having main supporting wings arranged at a dihedral angle and outer auxiliary wings attached by obliquely cut lateral edges to the outer lateral edges of the main wings, said auxiliary wings being extended outwardly and rearwardly with relation thereto, said main wings being composed each of a rigid forward portion and a rear portion pivoted to said forward portion on an axis transverse to the direction of flight, said auxiliary wings being secured to said rear wing portion, and the latter having provision for checking its movement about the rigid forward portion.

13. An airplane having main supporting wings comprising each a rigid forward portion and a rear portion pivoted to said forward portion to adjustably turn about an axis transverse to the direction of flight, auxiliary outer wings secured to each rear portion and extending rearwardly and outwardly therefrom, and means for checking the turning movement of said rear portion about the forward portion.

In witness whereof I affix my signature

FRIEDRICH WENK.

Witnesses:
  ERWIN WESINGER,
  MARIA SIEGER.